Sept. 28, 1965 G. E. HARMS ETAL 3,208,358

CONTROL APPARATUS

Filed June 15, 1962

*INVENTOR.*
GORDON E. HARMS
RAYMOND E. MICHEL
BY Roger W. Jensen
ATTORNEY.

3,208,358
CONTROL APPARATUS
Gordon E. Harms, Rogers, and Raymond E. Michel, Golden Valley, Minn., assignors to Honeywell Inc., a corporation of Delaware
Filed June 15, 1962, Ser. No. 202,735
6 Claims. (Cl. 92—91)

This invention pertains to fluid container means and more particularly to metal diaphragm means for use therein.

This invention has special application to the field of reaction control systems, but is not limited thereto. A reaction control system is the generic term applied to the control system utilized in various applications including space vehicle stabilization and attitude control in which the force utilized to control a vehicle is a reaction force that follows Newton's third law of motion. A common type of reaction control system is a hypergolic control system in which a gas is generated within a chamber in the vehicle through the utilization of hypergolic chemicals. A hypergolic chemical is defined as a chemical which is capable of self-ignition upon contact with another chemical. In practice, a plurality of suitable hypergolic chemicals are chosen so that a combustion occurs and a gas is generated when the chemicals are brought into contact in a particular manner in a suitable chamber. A reaction force is applied to the vehicle in response to the dissipation of the gas from the vehicle; the force is produced by the reaction of the acceleration of a gas of a given mass.

To utilize such hypergolic reaction control systems it is necessary to provide suitable storage facilities for the hypergolic chemicals. In most environmental conditions a pressurized supply container is suitable and satisfactory. However, in special environmental conditions, such as a zero gravity field, the reaction control system will not function properly unless the hypergolic chemical is fully pressurized and contained so as to eliminate any voids (volume not occupied by the hypergolic chemical) in the container. If the chemical is utilized in a zero gravity field, a void may be positioned over the entrance to the supply passage and thereby prevent the hypergolic chemical from reaching the combustion chamber.

The applicants have provided a unique metal diaphragm means which is positioned within a container so as to both pressurize and contain the fluid therein and insure the proper functioning of the hypergolic reaction system. The applicants' unique metal diaphragm means comprises a diaphragm having a first and a second configuration. A first configuration of the diaphragm means, in one embodiment, is a hemisphere. The hemisphere is deformed into a pair of spherical surfaces, in one embodiment, so as to define a second configuration. One of the spherical surfaces is concave and the other spherical surface is convex. A pressure differential across the diaphragm means is effective to change the diaphragm means from the second configuration to the first configuration.

It is therefore an object of this invention to provide an improved control apparatus.

This and other objects of the invention will become apparent from a study of the accompanying specification and claims in conjunction with the drawing in which:

Figure 1:
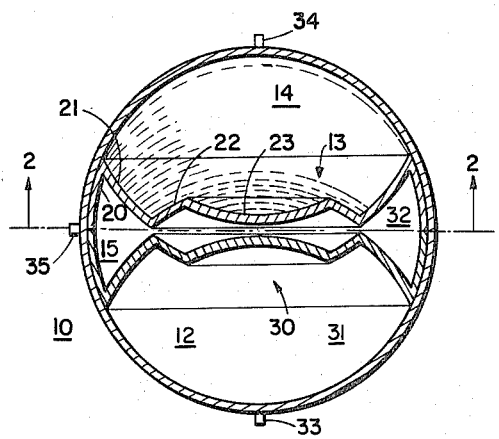
FIGURE 1 is a cross-sectional view taken along section lines 1—1 of FIGURE 2.

Referring now to FIGURE 1, reference numeral 10 generally depicts a fluid container means utilizing the applicants' unique diaphragm means therein. Reference numeral 11 identifies a spherically shaped container. Container 11 has a spherical chamber or cavity 12 therein.

A first diaphragm means 13 is positioned within spherical cavity 12. Diaphragm means 13 is shown in a first configuration or a collapsed condition in FIGURE 1. In its collapsed condition, diaphragm means 13 comprises a generally circular disk means having a plurality of configurations on the surfaces thereof. It should be noted that diaphragm means 13 divides spherical chamber 12 into two smaller cavities 14 and 15. Reference numeral 16 identifies a first corrugation and reference numeral 17 identifies a second corrugation. Corrugation comprises a first spherical surface 20 and a second spherical surface 21. The spherical surface 20 is concave with respect to a plane perpendicular to the plane of the drawing and including section lines 2—2 and has a radius equal to the radius of the spherical cavity 12. The second spherical surface 21 is convex and has a radius equal to the radius of spherical cavity 12. Thus, spherical sufface 20 and spherical surface 21 are oppositely convex. Corrugation 17 also comprises a pair of spherical surfaces 22 and 23. Spherical surface 22 is concave and has a radius equal to the radius of the spherical cavity 12. Spherical surface 23 is convex and has a radius equal to the radius of spherical cavity 12. Thus, spherical surface 22 and spherical surface 23 are oppositely convex. Convex spherical surfaces 21 and 23 are actually mirror images of the spherical surface defining the cavity 12. It should be noted that the number of corrugations required will vary with the size and shape of the container; a single corrugation or a plurality may be utilized.

A second diaphragm means 30 is also positioned within spherical cavity 12 of container 11, or more specifically within cavity 15. Second diaphragm means 30 is substantially identical to diaphragm means 30. Second diaphragm means 30 divides cavity 15 into two smaller cavities 31 and 32. Thus spherical cavity 12 of container 11 is divided into three smaller cavities 14, 31 and 32 by means of diaphragm means 13 and 30. The applicant means of diaphragm means 13 and 30. The applicants does not wish to be limited to the particular positional relationship of diaphragm means 13 and 30 illustrated in FIGURE 1, various modifications thereof are within the scope of the invention. For example, diaphragm means 13 and 30 need not have identical geometric configurations.

A connector means 13 is attached to container 11 and connects cavity 31 to a combustion chamber (not shown). A connection means 34 is attached to container 11 so as to connect cavity 14 to the combustion chamber (not shown). A connector means 35 is attached to container 11 so as to connect cavity 32 to a suitable fluid supply source (not shown).

In operation, fluid such as a hypergolic chemical fills cavity 14 and cavity 31 of container 11. The fluid contained within cavity 14 is connected to a suitable combustion chamber through connection means 34. The fluid contained within cavity 31 is connected to the suitable combustion chamber by means of connector means 33. A third fluid such as high pressure air is introduced through connector means 35 into cavity 32 between diaphragm means 13 and 30. The fluid introduced to cavity 32 is at a higher pressure than that of the fluids in chambers 14 and 31. When the diaphragm means 13 and 30 are fabricated from aluminum 1100 or aluminum 6061, as designated by the Aluminum Association, a pressure differential between cavity 32 and cavities 13 and 14 of 10 p.s.i. has been found sufficient for operation. Any material which is equivalent to aluminum 1100 or 6061 may be utilized. When a sufficient pressure differential exists across the diaphragm means 13 and 30 the corrugations unroll as indicated by the dotted lines in FIGURE 1. There is no resiliency in the diaphragm means 13 and 30. The corrugations are unrolled; they do not snap into the second configuration or expanded condition.

More specifically, when a sufficient pressure differential exists across the diaphragm means 13, the weakest point of diaphragm means 13 begins to unroll first. In the embodiment illustrated in FIGURE 1, the midpoint of spherical surface 23 is the weakest structural point of diaphragm means 13. Consequently a small bubble appears upon spherical surface 23 conforming to the dotted lines illustrated in FIGURE 1 and continues to grow until spherical surface 23 becomes wholly concave. At this point spherical surface 23 and spherical surface 22 will define a single concave spherical surface. Then this concave surface begins to unroll as indicated by the dotted lines in FIGURE 1. Spherical surface 21 continues to unroll until it is wholly concave in nature. At this point, surface 20, spherical surface 21, spherical surface 22 and spherical surface 23 define a hemisphere which is substantially equal in volume to cavity 14. Thus it is seen the cavity 14 is continually reduced in volume due to the unrolling of the corrugations of diaphragm means 13. A fluid within cavity 14 is under pressure at all times and contained by diaphragm 13 so that no voids may form over connector means 34. Consequently the fluid is continuously expelled from cavity 14 and cavity 31 without interruption.

Experience has shown that the expulsion efficiency of diaphragm means 13 is approximately 95 percent or greater. Stated otherwise, approximately 95 percent or more of the fluid contained within cavity 14 is expelled by diaphragm means 13 upon unrolling from a collapsed condition to an expanded condition. The unrolling of diaphragm means 13 is not completely reversible. Diaphragm means 13 in its expanded condition cannot be reduced to the collapsed configuration illustrated in FIGURE 1 by reversing the pressure differential. However, partial reversibility is available depending on the particular shape of the corrugations in diaphragm means 13 in the collapsed condition. Experience has proven it is possible to reverse the spherical surface 23 from convex to concave and back to convex merely by reversing the pressure. This allows testing of the apparatus without destruction thereof.

Figure 3:
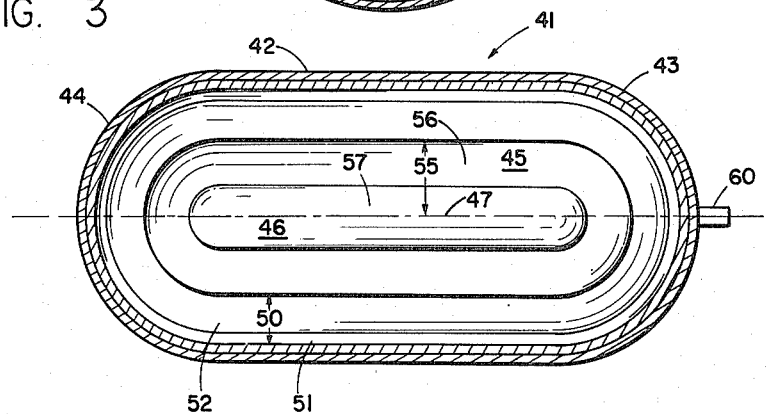
FIGURE 3 is an alternate embodiment of the applicants' invention in cross-section.

An alternate embodiment of the applicants' invention is disclosed in FIGURE 3. Reference numeral 40 generally depicts a fluid container means utilizing the applicants' invention. Reference numeral 41 identifies a container comprising a cylindrical portion 42 and spherical end portions 43 and 44. Container 41 has a cavity 45 therein which is of substantially the same shape as the container exterior, that is, a cylindrical portion and spherical end portions. A center line of cavity 45 is identified by reference numeral 47.

A diaphragm means 46 is positioned within cavity 45 of container 41. Diaphragm means 46 is similar in nature to that disclosed in FIGURES 1 and 2 and comprises a first and a second configuration. However it is adapted to conform to the geometric configuration of cavity 45. Diaphragm means 46 is illustrated in FIGURE 3 in a first configuration or collapsed condition and a plurality of corrugations are visible on the surface thereof. A first corrugation 50 comprises a pair of spherical surfaces 51 and 52. Spherical surface 51 is concave as viewed in FIGURE 3 with respect to the plane of the drawing and has a radius equal to the radius of cavity 45. Spherical surface 52 is convex and has a radius equal to the radius of cavity 45. It should be noted that the radius of the cylindrical portion of cavity 45 is equal to the radius of the spherical portion of cavity 45. Thus although the radius of cavity 45 in the cylindrical portion is measured in a plane perpendicular to the plane of the drawing and perpendicular to center line 47 is equal to the radius of cavity 45 in the spherical end portions in which the radius is measured in a plane perpendicular to the plane of the drawing and aligned with center line 47. A second corrugation is identified by reference numeral 55. Corrugation 55 comprises a spherical surface 56 which is concave as viewed in FIGURE 3 with respect to the plane of the drawing and spherical surface 57 which is convex. The applicants do not wish to be limited to the particular geometric configuration illustrated in FIGURE 3; other embodiments are within the scope of the applicants' invention. For example, the end portions of cavity 45 may be any surface of revolution.

A cross-sectional view of the embodiment illustrated in FIGURE 3, perpendicular to the plane of the drawing and perpendicular to center line 47, would be similar to FIGURE 1. Diaphragm means 46 in a second configuration or expanded condition substantially occupies cavity 45. A connector means 60 is attached to container 41 so as to connect cavity 45 to a fluid supply source (not shown).

It should be noted that the diaphragm means need not divide the cavity into two separate cavities or compartments. It is within the scope of this invention to position two diaphragm means back-to-back within a single cavity. The diaphragm means thus occupy a minimum amount of volume within the cavity. It is also possible to utilize only a single diaphragm means within a cavity to divide it into two separate cavities having any desired ratio of volume therebetween. The ratio required would determine the number of corrugations required and the shape thereof.

Figure 2:
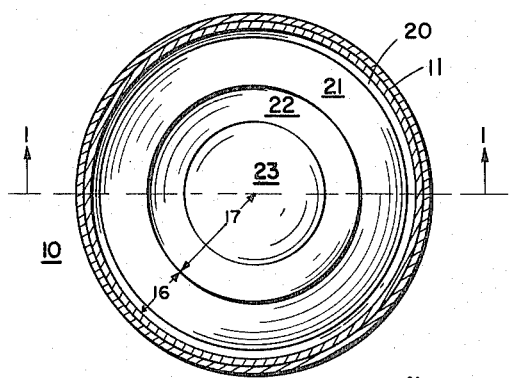
FIGURE 2 is a cross-sectional view taken along section lines 2—2 of FIGURE 1.

The embodiment illustrated in FIGURE 3 operates in a manner similar to the operation discussed with reference to FIGURES 1 and 2 and no further discussion thereof is deemed necessary.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In an apparatus of the class described: a container having a spherical chamber therein; metal diaphragm means having a collapsed condition and an expanded condition, said diaphragm means in said collapsed condition comprising a disc having a plurality of corrugations thereon, said diaphragm means in said collapsed condition being positioned within said chamber so as to divide said chamber into a pair of substantially hemispherical cavities, each of said plurality of corrugations comprising two oppositely convex spherical surfaces each having a radius substantially equal to the radius of one of said pair of cavities, said diaphragm means having a surface area substantially equal to the surface area of said one of said pair of cavities; and fluid means within said cavities, said diaphragm in said expanded condition comprising a hemisphere which substantially occupies said one of said pair of cavities, a pressure differential across said diaphragm means in said collapsed condition being effective to unroll said corrugations and place said diaphragm means in said expanded condition thereby expelling substantially all of said fluid means from said one of said cavities.

2. In an apparatus of the class described: a container having a chamber therein; and metal diaphragm means having a collapsed condition and an expanded condition, said diaphragm means in said collapsed condition being generally laminar with a corrugation thereon, said diaphragm means in said collapsed condition being positioned within said chamber so as to divide said chamber into a plurality of cavities, at least one of said plurality of cavities having a circular cross section, said corrugation comprising a pair of oppositely convex surfaces each having a radius substantially equal to the radius of said one of said plurality of cavities, said diaphragm means in said expanded condition defining a surface substantially equal to the surface of said one of said plurality of cavities, said diaphragm means in said collapsed condition being placed in said expanded condition when subjected to a pressure differential thereacross.

3. In an apparatus of the class described: a container having a cylindrical chamber therein; and metal diaphragm means, said diaphragm means having a collapsed condition and an expanded condition, said diaphragm means in said collapsed condition being generally laminar with a corrugation thereon, said diaphragm means in said collapsed condition being positioned within said chamber so as to divide said chamber into two cavities, said corrugation comprising two oppositely convex surfaces having a radius equal to the radius of said chamber, said chamber having a surface area substantially equal to the surface area of one of said two cavities, said diaphragm means in said expanded condition defining a surface which substantially occupies said one of said two cavities, a pressure differential across said diaphragm in said collapsed condition being effective to unroll said corrugations and place said diaphragm means in said expanded condition.

4. In an apparatus of the class described: a container having a chamber therein; and metal diaphragm means positioned within said chamber, said diaphragm means having a first and second configuration, said diaphragm means in said first configuration defining a hemisphere, said hemisphere being deformed into two oppositely convex spherical surfaces so as to define said second configuration, each of said two spherical surfaces having a radius equal to the radius of said hemisphere, said diaphragm means being changed from said second configuration to said first configuration when subjected to a pressure differential thereacross.

5. A metal diaphragm means having a first and second configuration, said diaphragm means in said first configuration defining a hemisphere, said hemisphere being deformed into two oppositely convex spherical surfaces so as to define said second configuration, each of said surfaces having a radius equal to the radius of said hemisphere, said diaphragm means being changed from said second configuration to said first configuration when subjected to a pressure differential thereacross.

6. A metal diaphragm means having a first and second configuration, said diaphragm means in said first configuration defining a cylindrical surface, said surface being deformed into a corrugation, said corrugation comprising two oppositely convex surfaces, each of said convex surfaces having a radius equal to the radius of said cylindrical surface, said diaphragm means being changed from said second configuration to said first configuration when subjected to a pressure differential thereacross.

References Cited by the Examiner

UNITED STATES PATENTS

| | | | |
|---|---|---|---|
| 2,343,320 | 3/44 | Parker | 138—30 |
| 2,345,475 | 3/44 | Herman | 138—30 |
| 2,697,448 | 12/54 | Gates. | |
| 2,744,380 | 5/56 | McMillan | 60—39.48 |
| 3,066,699 | 12/62 | Peet | 138—30 |

FRED E. ENGELTHALER, *Primary Examiner.*

MILTON BUCHLER, *Examiner.*